Nov. 24, 1959     A. E. POWELL     2,914,672
FREQUENCY DISCRIMINATOR FOR FREQUENCY-MODULATED PULSES
Filed July 17, 1957
FIG. 1
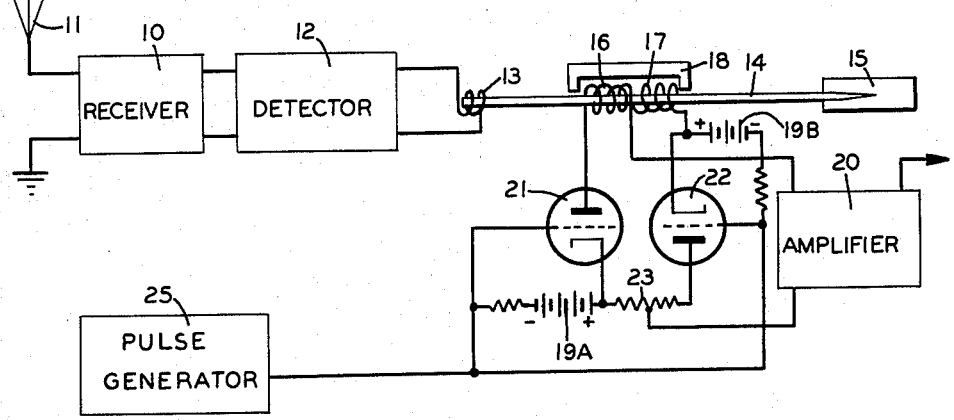
FIG. 2
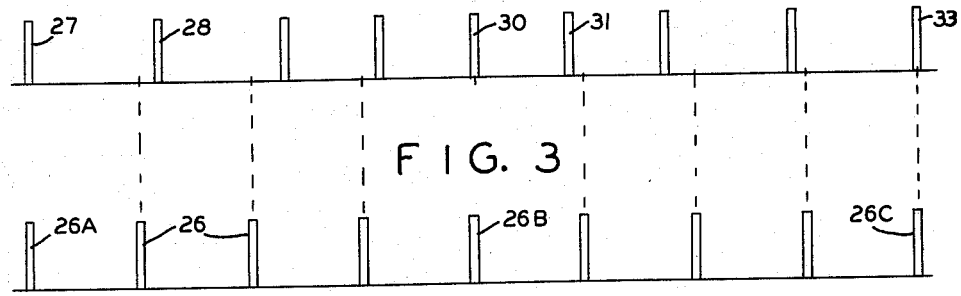
FIG. 3
FIG. 4
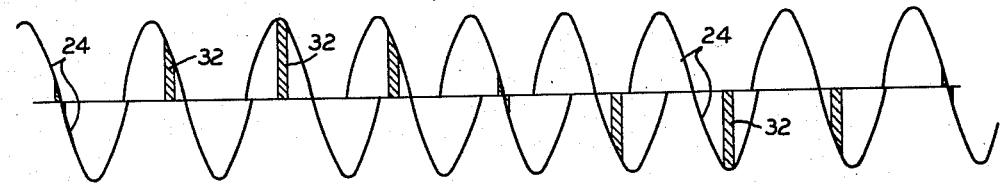
FIG. 5
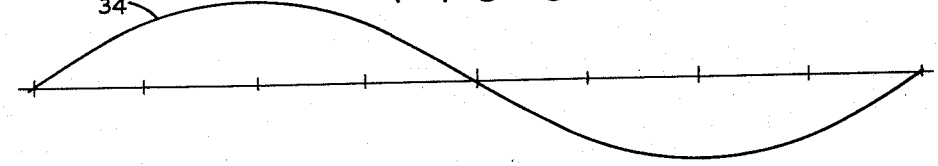
INVENTOR.
ALBERT E. POWELL
BY John P. Chandler
HIS ATTORNEY.

United States Patent Office 2,914,672
Patented Nov. 24, 1959

2,914,672

FREQUENCY DISCRIMINATOR FOR FREQUENCY-MODULATED PULSES

Albert E. Powell, Chatham, N.J., assignor to Byford Labs., Inc., Mamaroneck, N.Y., a corporation of New York Application July 17, 1957, Serial No. 672,393

8 Claims. (Cl. 250—27)

This invention relates to a frequency discriminator which produces amplitude-modulated pulses from a train of frequency-modulated pulses. It has particular reference to the application of a magnetostrictive delay line for providing a simplified gating arrangement to produce the amplitude-modulated pulses.

Prior art circuits for converting frequency modulated pulses into amplitude-modulated pulses have been complex and have required a variety of gating circuits and associated equipment for producing the desired result. The present invention is simple, has a minimum of parts, and cannot get out of adjustment since there are no complicated phase relationships to be maintained.

One of the objects of this invention is to provide an improved frequency discriminator for frequency-modulated pulses which avoids one or more of the disadvantages and limitations of prior art arrangements.

Another object of the invention is to simplify the equipment necessary to demodulate frequency-modulated pulses.

Another object of the invention is to increase the reliability of demodulating circuits.

The invention comprises a magnetostrictive delay line assembly which includes a magnetostrictive line terminated by a reflection damping device, a transmitting coil, and a double receiving coil for producing sinusoidal pulses when a magnetostrictive pulse traverses the line. The transmitting coil is connected to the usual radio receiver and detector which produces frequency modulated pulses in the coil. A double rectifier circuit is connected to the double receiving coil for passing selected portions of the sinusoidal pulses and a pulse generator is connected to a control means in the rectifier circuit for controlling the rectifier conductivity.

In the drawings:

Fig. 1 is a schematic diagram of connections of the frequency discriminator showing some of the circuit components in block form.

Fig. 2 is a graph showing a train of frequency modulated pulses as they are applied to the transmitting coil.

Fig. 3 is a graph showing a train of equally spaced pulses as produced by the pulse generator.

Fig. 4 is a graph showing the sinusoidal pulses as produced by the double receiving coil and also showing the amplitude-modulated pulses as applied to a utilization circuit.

Fig. 5 is a graph showing the resultant sine wave produced by the utilization circuit.

Referring now to Fig. 1, a receiver 10 is connected to an antenna 11 or to any other convenient transmission system which may convey frequency-modulated pulses. A detector circuit 12 is connected to the receiver for demodulating the radio frequency waves and producing frequency-modulated pulses at its output circuit which in this case is connected directly to a transmitting coil 13 surrounding a magnetostrictive delay line 14. Transmitting coil 13 may be positioned at the very end of line 14 as shown in the diagram in order to eliminate reflections from that end. The other end of the line 15 is a double receiving coil including two parts 16 and 17 designed to produce electrical pulses of opposite polarity whenever a magnetostrictive pulse traverses line 14. In order to produce sinusoidal waves, coils 16 and 17 are considerably wider than the usual receiving coils which are designed to produce sharp pulses. A magnetic bias is necessary for the line in order to produce electrical pulses having opposite polarity. This bias may be produced by a direct current in the coils but it has been found more convenient, especially in this application, to provide the bias by placing a permanent magnet 18 around the coils, thereby producing an unvarying magnetic flux in line 14 adjacent to the receiving coils.

Coils 16 and 17 are connected together and this junction point is connected to a utilization circuit 20 which may be an amplifier. The outer ends of coils 16 and 17 are connected to two rectifiers 21 and 22 which are connected together to an impedance 23 having its midpoint connected to the utilization circuit 20. Rectifiers 21 and 22 are connected so that one of them 21 passes only positive pulses from coil 16 while the other rectifier 22 passes only negative pulses from coil 17, this combination producing a sinusoidal wave having a positive and negative portion as shown by curve 24 in Fig. 4. Rectifiers 21 and 22 are controllable to be either conducting or non-conducting. Such rectifier elements may include three electrode electron discharge devices as shown in Fig. 1 or they may include transistors or two element rectifier components controlled by an external voltage bias. Rectifiers 21 and 22 as shown in Fig. 1 have their control electrodes connected to a pulse generator 25 which applies a series of positive pulses to the normally non-conducting rectifiers to make them conduct for the duration of the applied pulse. The control electrodes are biased by batteries 19A and 19B to make the rectifiers normally non-conductive.

Pulse generator 25 is arranged to generate a series of positive pulses 26, graphically shown in Fig. 3, unvarying in frequency and adjusted to have a frequency which is equal to the zero modulation frequency of the received pulse train.

Fig. 2 shows a graph of a pulse train which varies in frequency, the time interval between pulse 27 and 28 being considerably longer than the time interval between pulse 30 and pulse 31, this variation in time interval producing the frequency modulation which carries information. The curve shown in Fig. 5 is an integrated sine wave which is produced from the amplitude modulated pulses 32 shown in Fig. 4 and may be obtained by several well-known circuits.

The operation of this circuit is as follows: Pulses received by the receiver 10 and detector 12 are applied to coil 13 and produce magnetostrictive pulses in line 14, these pulses being spaced along the line as shown in Fig. 2 and traveling from transmitting coil 13 to the reflection absorbing terminal 15. As the pulses traverse the line through coils 16 and 17 they generate sinusoidal pulses in coils 16 and 17 similar to the pulses 24 shown in Fig. 4. At the same time pulse generator 25 is supplying positive pulses to the control electrodes of rectifier units 21 and 22, these later pulses having a constant frequency. If the sinusoidal pulse 24 has its zero point coincident with control pulse 26A, a very small positive pulse and an equally small negative pulse will be sent to amplifier 20. This condition is shown in Figs. 2, 3 and 4, directly under pulses 27, 30 and 33. When pulses 26 from the pulser generator 25 are not coincident with the pulses which pass along the line 14, rectifier components 21 or 22 will be made conductive so that considerable current is permitted to pass from coil 16 through rectifier 21 or from coil 17 through rectifier 22, these pulses being shown graphically in Fig. 4 and crosshatched for illustrative purposes. It will be obvious from an inspection of Fig. 4 that the transmitter pulses 32 are amplitude modulated and can be made to produce a sine wave 34 as shown in Fig. 5.

In the example shown pulses 27, 30 and 33, of Fig. 2, are drawn coincident with pulses 26A, 26B and 26C, this coincidence producing a simple diagram and affording a greater measure of understanding of the conversion operation. This coincidence is not necessary for the operation of the device and wave 34 does not have to be an exact multiple of the pulses shown in Figs. 2 and 3. The system described above may accept frequency-modulated pulses at any modulation frequency from 0 to 3,000 cycles per second and produce an output wave 34 having the same frequency.

While there have been described and illustrated a specific embodiment of the invention, it will be obvious that various changes and modifications can be made in the rectifier components and in other parts of the circuit without departing from the field of the invention which should be limited only by the scope of the appended claims.

I claim:

1. A frequency discriminator for a frequency-modulated pulse train comprising; a magnetostrictive delay line assembly including a magnetostrictive line, a transmitting coil enclosing the line and connected to a receiving circuit for inducing magnetostrictive pulses into the line, a receiving coil enclosing the line and having two adjoining parts adapted to produce positive and negative sinusoidal pulses when a magnetostrictive pulse traverses the line; a permanent magnet positioned adjacent to the receiving coil for producing a magnetic bias in the line; a double rectifier circuit connected to said receiving coil for passing selected portions of said sinusoidal pulses to a utilization circuit; control means associated with said double rectifier; and a pulse generator connected to said control means for rendering the rectifiers conductive.

2. A frequency discriminator for a frequency-modulated pulse train comprising; a magnetostrictive delay line assembly including a magnetostrictive line terminated by a reflection damping device, a transmitting coil enclosing the line and connected to a receiving circuit for inducing magnetostrictive pulses into the line, a receiving coil enclosing the line and having two adjoining parts adapted to produce positive and negative sinusoidal pulses when a magnetostrictive pulse traverses the line; magnetic means adjacent to the receiving coil for producing a magnetic bias in the line; a double rectifier circuit connected to said receiving coil for passing selected portions of said sinusoidal pulses to a utilization circuit; control means associated with said double rectifier; and a pulse generator connected to said control means for controlling the double rectifier to pass portions of said sinusoidal pulses at a predetermined repetitive rate.

3. A frequency discriminator for a frequency-modulated pulse train comprising; a magnetostrictive delay line assembly including a magnetostrictive line, a transmitting coil enclosing the line and connected to a receiving circuit which receives said frequency modulated pulse train, said coil inducing magnetostrictive pulses into the line, a receiving coil adjacent to a magnetic bias means and enclosing the line, said coil having two adjoining parts and adapted to produce positive and negative sinusoidal pulses when a magnetostrictive pulse traverses the line; a double rectifier circuit connected to the ends of the receiving coil for passing selected portions of said sinusoidal pulses to a utilization circuit; control means associated with said double rectifier; and a pulse generator connected to said control means for rendering the rectifiers conductive at a predetermined repetitive rate.

4. A frequency discriminator for a frequency-modulated pulse train comprising, a magnetostrictive line terminated by a reflection damping device; a transmitting coil enclosing the line and connected to a receiving circuit for inducing magnetostrictive pulses into the line; a receiving coil having two adjoining parts enclosing the line and adapted to produce positive and negative sinusoidal pulses when a magnetostrictive pulse traverses the line; magnetic means adjacent to the receiving coil for producing a magnetic bias in the line; a double rectifier circuit including two electron discharge devices each having a cathode, an anode, and a control electrode; said rectifier circuit connected to said receiving coil for passing selected portions of said sinusoidal pulses to a utilization circuit; and a pulse generator connected to said control electrodes for rendering the rectifiers conductive at a predetermined rate.

5. A frequency discriminator for a frequency-modulated pulse train comprising; a magnetostrictive delay line assembly including a magnetostrictive line, a transmitting coil enclosing the line and connected to a receiving circuit for inducing magnetostrictive pulses into the line, and a receiving coil having two adjoining parts enclosing the line and adapted to produce positive and negative sinusoidal pulses when a magnetostrictive pulse traverses the line; magnetic means adjacent to the receiving coil for producing a magnetic bias in the line; a double rectifier circuit connected to said double receiving coil for passing selected portions of said sinusoidal pulses to a utilization circuit; control means associated with said double rectifier; and a pulse generator connected to said control means for rendering the rectifiers conductive at a predetermined repetitive rate, the amplitude of said selected portions being proportional to the pulse frequency of said frequency-modulated pulse train.

6. A frequency discriminator for a frequency-modulated pulse train comprising; a magnetostrictive delay line assembly including a magnetostrictive line, a transmitting coil enclosing the line and connected to a receiving circuit which receives said frequency modulated pulse train, said coil inducing magnetostrictive pulses into the line, and a receiving coil having two adjoining parts adjacent to a magnetic bias means and enclosing the line, said coil adapted to produce positive and negative sinusoidal pulses when a magnetostrictive pulse traverses the line; a double rectifier circuit connected to said receiving coil for passing selected portions of said sinusoidal pulses to a utilization circuit; and a pulse generator connected to said control means for rendering the rectifiers conductive at a predetermined repetitive rate, the amplitude of said selected portions being proportional to the pulse frequency of said frequency-modulated pulse train.

7. A frequency discriminator for a frequency-modulated pulse train comprising, a magnetostrictive delay line assembly including a magnetostrictive line, a transmitting coil enclosing the line and connected to a receiving circuit for inducing magnetostrictive pulses into the line, a receiving coil enclosing the line having two adjoining parts and adapted to produce positive and negative sinusoidal pulses when a magnetostrictive pulse traverses the line; magnetic means adjacent to the receiving coil for producing a magnetic bias in the line; a double rectifier circuit connected to said receiving coil for passing selected portions of said sinusoidal pulses to a utilization circuit; control means associated with said double rectifier; and a pulse generator connected to said control means for rendering the rectifiers conductive and nonconductive, said pulse generator adjusted to produce a series of positive pulses separated by equal time intervals.

8. A frequency discriminator for a frequency-modulated pulse train comprising; a magnetostrictive delay line assembly including a magnetostrictive line, a transmitting coil enclosing the line and connected to a receiving circuit for inducing magnetostrictive pulses into the line, a receiving coil enclosing the line having two adjoining parts and adapted to produce positive and negative sinusoidal pulses when a magnetostrictive pulse traverses the line, and a permanent magnet positioned adjacent to the double coil for producing a magnetic bias in the line; a double rectifier circuit connected to said receiving coil for passing selected portions of said sinusoidal pulses to a utilization circuit; control means associated with said double rectifier for controlling the current therethrough; and a pulse generator connected to said control means for rendering the rectifiers conductive and nonconductive, said pulse generator adjusted to produce a series of pulses having a constant repetition rate.

References Cited in the file of this patent

UNITED STATES PATENTS

| | | |
|---|---|---|
| 2,335,265 | Dodington | Nov. 30, 1943 |
| 2,532,338 | Schlesinger | Dec. 5, 1950 |
| 2,738,386 | Roberts | Mar. 13, 1956 |
| 2,797,410 | Korman et al. | June 25, 1957 |